（12） United States Patent
Rodrigues et al.

(10) Patent No.: US 7,819,681 B1
(45) Date of Patent: Oct. 26, 2010

(54) THERMALLY EFFICIENT BUSWAY JOINT PACK

(76) Inventors: Carlton R. Rodrigues, 1197 Mt. Vernon La., Mt. Juliet, TN (US) 37122; Edgar Avalos Ortiz, 3920 Puckett Creek Crossing, Apt. 706, Murfreesboro, TN (US) 37128; Glenn S. O'Nan, 6995 Imhoff Rd., Oxford, OH (US) 45056; Jim Ramsey, 1910 Starbuck Ct., Murfreesboro, TN (US) 37130; Thomas Reed, Jr., 14001 Rhine Ct., Seneca, SC (US) 29672

( * ) Notice: Subject to any disclaimer, the term of this patent is extended or adjusted under 35 U.S.C. 154(b) by 0 days.

(21) Appl. No.: 12/488,328

(22) Filed: Jun. 19, 2009

(51) Int. Cl.
    *H01R 4/60* (2006.01)
(52) U.S. Cl. .................. 439/213; 174/88 B
(58) Field of Classification Search ............ 439/33, 439/213, 210, 212; 174/88 B, 71 B
    See application file for complete search history.

(56) References Cited

U.S. PATENT DOCUMENTS

| | | | | |
|---|---|---|---|---|
| 2,274,422 | A * | 2/1942 | Mahoney et al. ............ 174/73.1 |
| 3,004,096 | A * | 10/1961 | Rowe ........................ 174/88 B |
| 3,004,097 | A * | 10/1961 | Johnston et al. ............ 174/88 B |
| 3,180,924 | A * | 4/1965 | Rowe ........................ 174/88 B |
| 3,189,680 | A * | 6/1965 | Stanback .................... 174/88 B |
| 3,339,009 | A * | 8/1967 | Davis et al. ................. 174/72 B |
| RE26,310 | E * | 11/1967 | Moodie et al. .............. 174/68.2 |
| 3,376,377 | A * | 4/1968 | Fehr, Jr. ..................... 174/72 B |
| 3,504,100 | A * | 3/1970 | Ohshima et al. ............ 174/88 B |
| 3,519,730 | A * | 7/1970 | Hamilton, Jr et al. ...... 174/88 B |
| 3,559,148 | A * | 1/1971 | Hafer ......................... 439/213 |
| 3,609,215 | A * | 9/1971 | Giger et al. ................. 174/88 B |
| 3,683,313 | A * | 8/1972 | Weimer et al. .............. 439/213 |
| 4,097,103 | A * | 6/1978 | Krause ....................... 439/213 |
| 4,146,285 | A * | 3/1979 | Cook ......................... 439/213 |
| 4,174,143 | A * | 11/1979 | Hicks et al. ................. 439/213 |
| 4,213,003 | A * | 7/1980 | Carlson ...................... 174/88 B |
| 4,627,680 | A * | 12/1986 | Weimer et al. .............. 439/210 |
| 4,673,229 | A | 6/1987 | Jorgensen et al. |
| 4,678,253 | A * | 7/1987 | Hicks et al. ................. 439/210 |
| 4,820,177 | A | 4/1989 | Slicer |
| 4,842,533 | A * | 6/1989 | Beberman et al. ........... 439/213 |
| 4,849,581 | A * | 7/1989 | Larkin et al. ............... 174/88 B |
| 4,886,940 | A * | 12/1989 | Gagnon et al. ............. 174/88 B |
| 4,945,188 | A * | 7/1990 | Jackson ...................... 174/16.2 |
| 4,950,841 | A * | 8/1990 | Walker et al. ............... 174/88 B |
| 4,979,906 | A * | 12/1990 | Shrout et al. ................ 439/213 |
| 5,122,072 | A * | 6/1992 | Arn et al. ................... 439/210 |

(Continued)

FOREIGN PATENT DOCUMENTS

WO     WO 96/29768     9/1996

(Continued)

*Primary Examiner*—Ross N Gushi

(57) ABSTRACT

A busway joint pack includes a pair of opposing phase connector plates, a first insulating sheet, a second insulating sheet, a first side panel, and a second side panel. The busway joint pack passively transfers thermal energy generated in its core to an exterior housing such that the thermal energy is dissipated or transferred to the surrounding environment, which reduces the internal temperature of the joint pack. The first and the second insulating sheets are positioned and selected with a particular thermal resistance and dimensions such that a portion of the thermal energy generated in the core of the busway joint pack is transferred from the pair of opposing phase connector plates to the external housing.

18 Claims, 4 Drawing Sheets

U.S. PATENT DOCUMENTS

| | | | |
|---|---|---|---|
| 5,261,830 A * | 11/1993 | Jego et al. | 439/210 |
| 5,401,906 A * | 3/1995 | Bryant | 174/88 B |
| 5,760,339 A * | 6/1998 | Faulkner et al. | 174/88 B |
| 5,821,464 A * | 10/1998 | Graham et al. | 174/86 |
| 5,828,006 A | 10/1998 | Graham et al. | |
| 5,854,445 A | 12/1998 | Graham et al. | |
| 6,146,169 A * | 11/2000 | Calder et al. | 439/213 |
| 6,176,720 B1 * | 1/2001 | Johnson | 439/213 |
| 6,329,598 B1 * | 12/2001 | M'Sadoques et al. | 174/68.2 |
| 6,435,888 B1 * | 8/2002 | Reed, Jr. | 439/213 |
| 2005/0233625 A1 * | 10/2005 | Faulkner | 439/210 |
| 2009/0067131 A1 | 3/2009 | Yasuda et al. | |
| 2010/0012375 A1 * | 1/2010 | Jur et al. | 174/88 B |

FOREIGN PATENT DOCUMENTS

WO  WO 96/29769  9/1996

* cited by examiner

THERMALLY EFFICIENT BUSWAY JOINT PACK

FIELD OF THE INVENTION

The present invention relates generally to electrical distribution equipment and, more particularly, to thermally efficient busway joint packs.

BACKGROUND OF THE INVENTION

A busway system typically includes two or more busways, one or more busway joint packs, and may include a plurality of plug-in units. Each busway includes one or more phase-conductors and a housing. For example, in a three phase system, the busway can include three live phase-conductors or three live phase-conductors and one neutral-conductor, depending on the type of system architecture being employed. If required, various plug-in units or electrical components can be directly connected to one or more plug-in connection sites spaced along the busways to draw power. Each busway joint pack is used to physically and electrically connect two sections of busway or two sets of busway together. A common problem in busway systems is the management of the rise in temperature of the busway system within the busway joint pack. A rise in temperature within the busway joint pack limits the overall thermal performance of the busway system, which directly affects the required size of the busway and/or the size of the phase-conductors. Using larger phase-conductors to accommodate for the rise in temperature at the busway joint pack increases the size of, and accordingly the costs of, the materials needed to make the busway system. As phase-conductors are typically made of copper and/or aluminum, which can be expensive, such a solution can be expensive. Another problem caused by the rise in temperature at the busway joint pack is a potential degradation of the busway system due to excessive heat, melting, deformation, etc.

Thus, a need exists for an improved apparatus and system. The present disclosure is directed to satisfying one or more of these needs and solving other problems.

SUMMARY OF THE INVENTION

The present disclosure is directed to providing a thermally efficient busway joint pack. The thermally efficient busway joint pack is configured to passively transfer thermal energy or heat from its core to an exterior housing such that the thermal energy is lost or transferred to the surrounding environment, which reduces the internal temperature of the joint pack. The joint pack includes two thermally conductive and electrically insulating sheets of material on two opposing sides of the joint pack such that each sheet abuts an end surface of at least one pair of opposing phase connector plates. The phase connector plates define a space therebetween that receives and electrically connects two phase conductors, which generates thermal energy during operation of the busway system. The sheets of material sufficiently electrically insulate internal components of the joint pack from ground including the exterior housing. The sheets are selected with a particular thermal resistance and dimensions such that a portion of the thermal energy generated is transferred from the phase connector plates to the external housing.

A busway joint pack includes a pair of opposing phase connector plates, a first insulating sheet, a second insulating sheet, a first side panel, and a second side panel. The pair of opposing phase connector plates defines a space therebetween. The first insulating sheet is positioned orthogonal to the pair of opposing phase connector plates and abuts a first side surface of the pair of opposing phase connector plates on one side of the busway joint pack. The second insulating sheet is positioned orthogonal to the pair of opposing phase connector plates and abuts a second side surface of the pair of opposing phase connector plates on an opposing side of the busway joint pack. The first side panel is adjacent to the first insulating sheet on the one side of the busway joint pack and the second side panel is adjacent to the second insulating sheet on the opposing side of the busway joint pack.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

DETAILED DESCRIPTION OF THE ILLUSTRATED EMBODIMENTS

Although the invention will be described in connection with certain aspects and/or embodiments, it will be understood that the invention is not limited to those particular aspects and/or embodiments. On the contrary, the invention is intended to cover all alternatives, modifications, and equivalent arrangements as may be included within the spirit and scope of the invention as defined by the appended claims.

Figure 1:
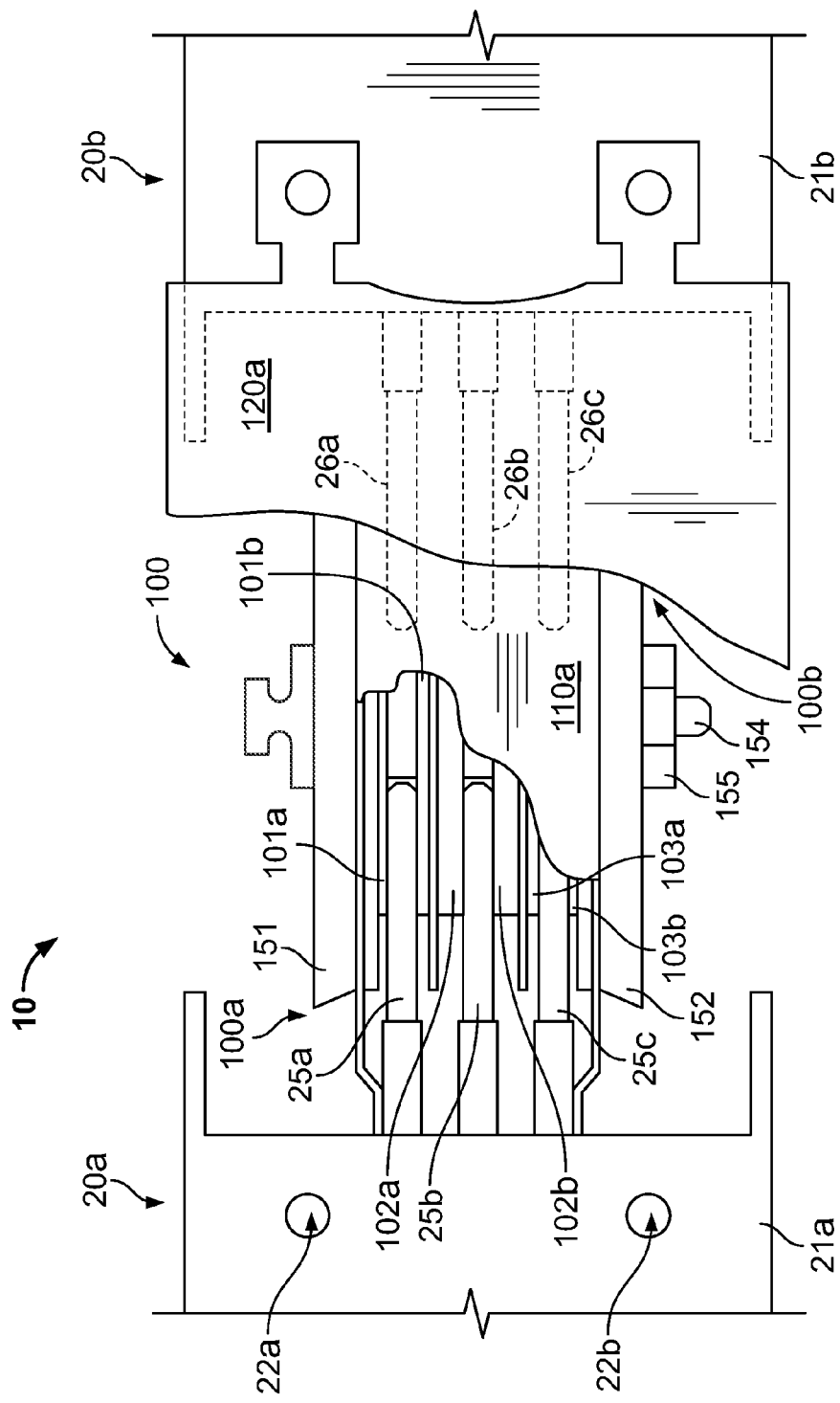
FIG. 1 is a side view of a busway system according to some aspects of the present disclosure.

Referring to FIG. 1, an exemplary busway system 10 is shown. The busway system 10 includes a joint pack 100, a first busway section 20a, and a second busway section 20b. The first and the second busway sections 20a,b are three pole busways and/or three phase busways. The first busway section 20a includes a busway housing 21a and three phase-conductors 25a-c. Each of the phase-conductors 25a-c are electrically insulated from each other and the housing 21a. Each of the phase-conductors 25a-c have at least one exposed end configured to physically and electrically mate with a first end 100a of the joint pack 100, as shown in FIG. 1.

Similarly, the second busway section 20b includes a busway housing 21b and three phase-conductors 26a-c. Each of the phase-conductors 26a-c are electrically insulated from each other and the housing 21b. Each of the phase-conductors 26a-c have at least one exposed end configured to mate with a second opposing end 100b of the joint pack 100 in the same manner as the three phase conductors 25a-c mate with the first end 100a. The joint pack 100 is configured such that when the first busway section 20a and the second busway section 20b are both physically engaged with the joint pack 100, as shown in FIG. 1, the joint pack 100 electrically couples each of the three phase conductors 25a-c with a respective one of the phase-conductors 26a-c of the second busway section 20b. For example, the first phase-conductor 25a of the first busway section 20a is electrically connected with the first phase-conductor 26a of the second busway section 20b.

According to some alternative embodiments, the busway sections 20a,b are four pole busways. In these embodiments, each of the busway sections includes three phase-conductors and one neutral-conductor (not shown).

Figure 2:
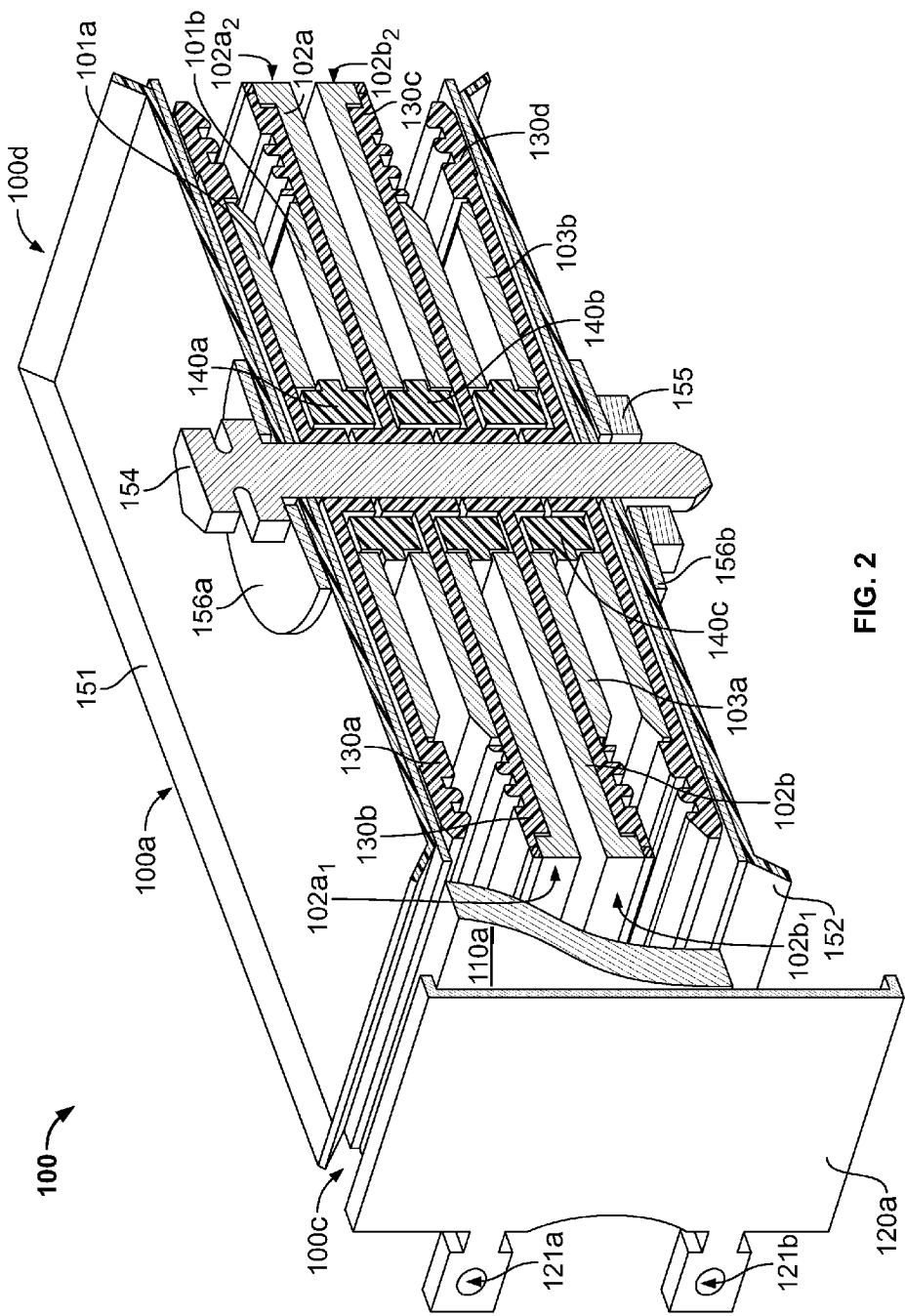
FIG. 2 is a partially exploded cross-sectional perspective view of a busway joint pack according to some aspects of the present disclosure.
Figure 3:
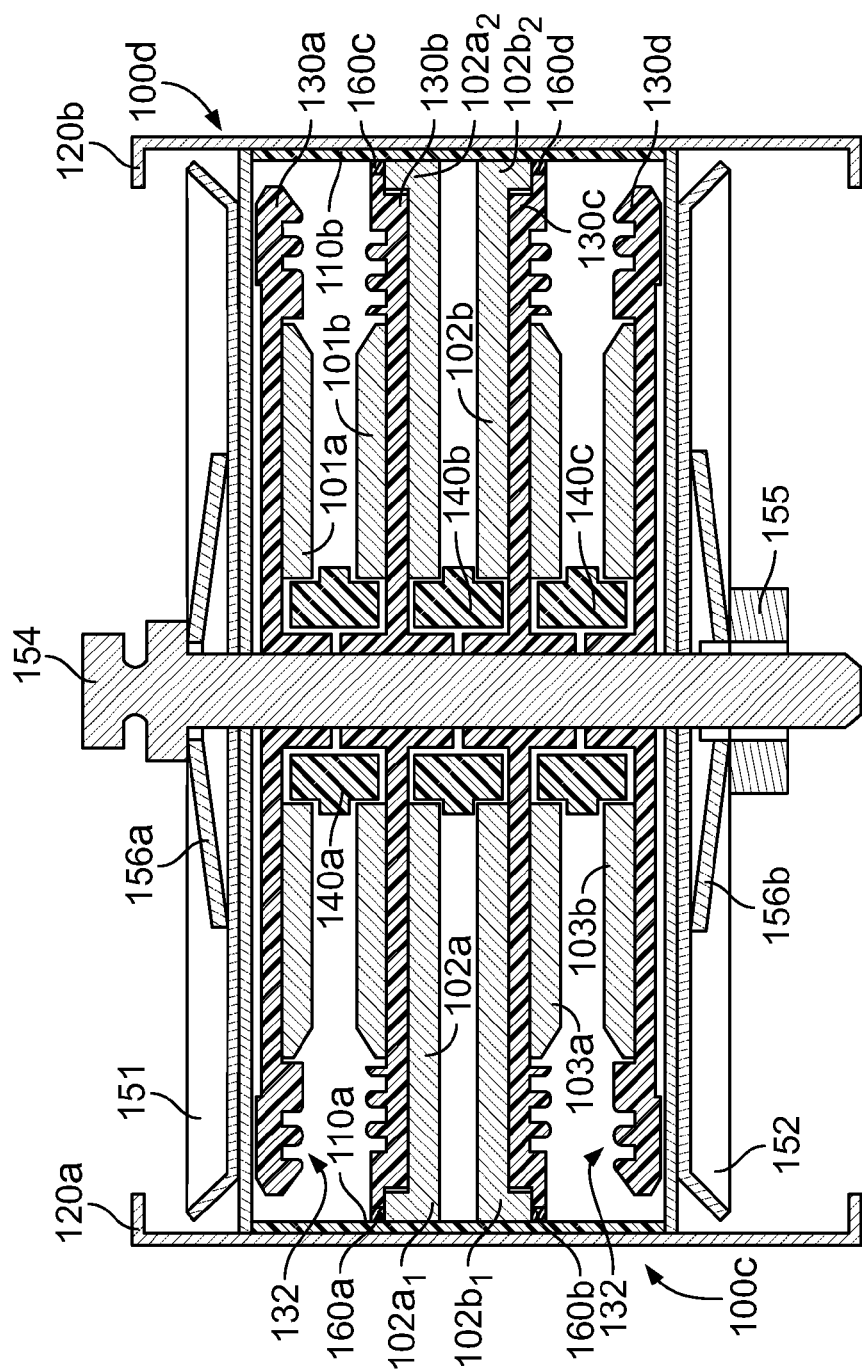
FIG. 3 is a cross sectional end view of the busway joint pack of FIG. 2.

Referring generally to FIGS. 1-3, the joint pack 100 is shown according to an exemplary configuration of the present disclosure. The joint pack 100 is a multi-phase joint pack, more particularly, the joint pack 100 is a three-phase joint pack. The joint pack 100 can also be referred to as a thermally efficient joint pack. The joint pack 100 is generally cube-shaped having the first end 100a (FIG. 1), the second opposing end 100b (FIG. 1), a first side 100c (FIGS. 2 and 3), and a second opposing side 100d (FIGS. 2 and 3). Adjacent to the first side 100c of the joint pack 100 is a first insulating sheet 110a that abuts a first side panel 120a, as best seen in FIG. 3. Similarly, adjacent to the second opposing side 100d of the joint pack 100 is a second insulating sheet 110b that abuts a second side panel 120b, as best seen in FIG. 3. A top of the joint pack 100 is generally defined by a lid 151 and a bottom of the joint pack 100 is generally defined by a base 152, as best seen in FIG. 2. Between the lid 151 and the base 152 the joint pack 100 includes three pairs of opposing connector plates 101, 102, and 103, insulating plates 130a-d, and phase spacers 140a-c. These joint pack components are coupled together with a bolt 154 and a nut 155, which is best seen in FIGS. 2 and 3, although other fasteners are contemplated. The three pairs of opposing connector plates 101, 102, and 103 are substantially parallel to one another. While the joint pack 100 is shown as having a certain number, type, and size of components, various other numbers, types, and sizes of components are contemplated.

Each of the pairs of opposing connector plates 101, 102, and 103 corresponds to a particular electrical phase of the joint pack 100. The first pair of opposing connector plates 101 corresponds to phase A, the second pair of opposing connector plates 102 corresponds to phase B, and the third pair of opposing connector plates 103 corresponds to phase C.

Each of the pairs of opposing connector plates 101, 102, and 103 defines a respective space therebetween for receiving a phase-conductor of a busway, such as one of the phase-conductors 25a-c, 26a-c shown in FIG. 1. The first pair of opposing connector plates 101 includes a first phase connector plate 101a and a second phase connector plate 101b. Similarly, the second pair of opposing connector plates 102 includes a first phase connector plate 102a and a second phase connector plate 102b, and the third pair of opposing connector plates 103 includes a first phase connector plate 103a and a second phase connector plate 103b. As best seen in FIGS. 2 and 3, the first and the second connector plates 102a,b of phase B extend out to the first side 100c and the second opposing side 100d, respectively, of the joint pack 100. The extended positioning of the second pair of opposing connector plates 102 allows the first and the second insulating sheets 110a,b to abut respective end surfaces of the second pair of connector plates 102. A first end $102a_1$ of the first connector plate 102a and a first end $102b_1$ of the second connector plate 102b abut the first insulating sheet 110a. Similarly, a second end $102a_2$ of the first connector plate 102a and a second end $102b_2$ of the second connector plate 102b abut the second insulating sheet 110b.

The first and the second ends $102a_{1,2}$ and $102b_{1,2}$ are flanged as illustrated to increase a contact surface area between the second pair of opposing connector plates 102 and the first and the second insulating sheets 110a,b. Such an increased contact surface area can increase the heat transfer from the second pair of opposing connector plates 102 to the first and the second side panels 120a,b. Such a transfer of thermal energy from the interior or core of the joint pack 100 to the first and the second side panels 120a,b can reduce an internal joint pack temperature, thereby improving the thermal performance of the busway system 10.

While only the second pair of opposing connector plates 102 of the joint pack 100 is shown in an extended position abutting the first and the second insulating sheets 110a,b, it is contemplated that other pairs of opposing connector plates can be extended in addition to, or in lieu of, the second pair of opposing connector plates 102. For example, the first, the second, and third pair of opposing connector plates 101, 102, and 103 can be extended in a similar fashion as described below in reference to FIG. 4. It is contemplated that extending additional pairs of opposing connector plates such that the end surfaces of the connector plates 101a,b and/or 103a,b abut the first and the second insulating sheets 110a,b can increase the heat transfer from the core of the joint pack 100 to the first and the second side panels 120a,b.

The connector plates 101a,b, 102a,b, and 103a,b can be made of any electrically conducting material, such as, for example, copper, gold, iron, etc. Each of the phase connector plates 101a,b, 102a,b, and 103a,b have a generally rectangular cross-section, a generally rectangular top profile, and an aperture therein. The phase connector apertures are generally positioned in a center of the generally rectangular top profile of each phase connector plate and configured to receive one of the phase spacers 140a-c. Respective ones of the phase spacers 140a-c separate the first and the second connector plates of each corresponding phase. For example, the first phase spacer 140a separates the first connector plate 101a from the second connector plate 101b, while maintaining a space for slidably engaging therebetween a phase-conductor.

The insulating plates 130a-d electrically insulate the A, B, and C phases from one another. The first and the second insulating plates 130a,b electrically insulate phase A from the other phases and ground. The second and the third insulating plates 130b,c electrically insulate phase B from the other phases. The third and the fourth insulating plates 130c,d electrically insulate phase C from the other phases and ground. The second insulating plate 130b is positioned between the second phase connector plate 101b of phase A and the first phase connector plate 102a of phase B to electrically insulate the A and B phases from one another. Similarly, the third insulating plate 130c is positioned between the second phase connector plate 102b of phase B and the first phase connector plate 103a of phase C to electrically insulate the B and C phases from one another. Each of the insulating plates 130a-d includes teeth-like ridges 132 (FIG. 3) that increase a surface area of the insulating plates 130a-d to aid in preventing electrical failures, such as, for example, over-surface and through-air flashovers between phases, and between one or more phases and ground.

The insulating plates 130a-d can be made of any electrically insulating material, such as, for example, plastic, rubber, MYLAR® (biaxially-oriented polyethylene terephthalate), polyvinyl chloride (PVC), bulk molded compound or thermoset, etc. Each of the insulating plates 130a-d has a generally rectangular cross-section, a generally rectangular top profile, and an aperture therein. The insulating plate apertures are generally positioned in a center of the generally rectangular top profile of each insulating plate. The insulating plate apertures are smaller than the phase connector apertures. Each of the insulating plate apertures can have a lip or ridge that mates with a corresponding one of the phase connector plate apertures as best shown in FIG. 3. The insulating plate apertures are sized and positioned to receive therethrough the bolt 154, or similar fastener to assemble the joint pack 100.

Assembly of the joint pack 100 includes arranging the various components of the joint pack 100, as best shown in FIG. 3. The components are arranged and/or stacked in the following order from the lid 151 through the base 152 of the joint pack 100: the lid 151, the first insulating plate 130*a*, the first connector plate 101*a* of phase A, the first phase spacer 140*a*, the second connector plate 101*b* of phase A, the second insulating plate 130*b*, the first connector plate 102*a* of phase B, the second phase spacer 140*b*, the second connector plate 102*b* of phase B, the third insulating plate 130*c*, the first connector plate 103*a* of phase C, the third phase spacer 140*c*, the second phase connector plate 103*b* of phase C, the fourth insulating plate 130*d*, and the base 152. Stacking the components in the preceding order automatically aligns respective apertures in each of the components such that the bolt 154 is slid through the common aperture positioned approximately at a center of the joint pack 100. The bolt 154 and the nut 155 can be tightened to secure the components together, thereby defining the respective spaces of each of the pairs of opposing connector plates 101, 102, and 103 for slidably engaging therebetween a phase-conductor of a busway.

The joint pack 100 includes a first washer 156*a* and a second washer 156*b*. The washers 156*a,b* can be included in the stack of components as shown in FIGS. 2 and 3. Tightening the bolt 154 and the nut 155 compresses the washers 156*a,b*, which aids in distributing the compressive load of the bolt 154 and the nut 155, as well as securing or locking the nut 155 in place to prevent an accidental loosening of the nut 155 during use of the joint pack 100 in the busway system 10.

After the pairs of opposing connector plates 101, 102, and 103, the insulating plates 130*a-d*, the phase spacers 140*a-c*, the lid 151, and the base 152 are rigidly coupled via the bolt 154 and the nut 155, assembly of the joint pack 100 continues with attaching the first insulating sheet 110*a* to the first side 100*c* of the joint pack 100, as best shown in FIGS. 2 and 3. Similarly, the second insulating sheet 110*b* is attached to the second opposing side 100*d* of the joint pack 100, as shown in FIG. 3. The first and the second insulating sheets 110*a,b* can be made from a resilient material. Alternatively, the first and the second insulating sheets 110*a,b* are made from a substantially rigid material. The first and the second insulating sheets 110*a,b* can be made from Gap Pad® 2000SF, which is available from the Bergquist Company. The first and the second insulating sheets 110*a,b* have a generally rectangular side profile and a generally rectangular cross-sectional area, although various other side profile and cross-sectional area shapes are contemplated. In various embodiments, the insulating sheets 110*a,b* can have a thickness of at least 10 mils, between 10 mils and 1 inch, or between 10 mils and 125 mils based on system requirements as further discussed below.

The insulating sheets 110*a,b* are made from thermally conductive and electrically insulating material. The first and the second insulating sheets 110*a,b* operate like heat sinks, which extract thermal energy and conduct the energy to a surrounding environment. The insulating sheets 110*a,b* electrically insulate the three pairs of opposing phase connector plates 101, 102, and 103 from the first and the second side panels 120*a,b* and the insulating sheets 110*a,b* transfer thermal energy and/or heat from the second pair of opposing connector plates 102 to the first and the second side panels 120*a,b*, which reduces the internal joint pack temperature. The reduction of internal joint pack temperature is based on a comparison of the joint pack 100 and an equivalently sized and configured joint pack that does not include any insulating sheets and does not include any extended phase connector plates as shown in FIGS. 1-3. The first and the second insulating sheets 110*a,b*, positioned as shown in FIGS. 1-3, result in a temperature reduction of the joint pack 100 of at least one degree Celsius. It is contemplated that the first and the second insulating sheets 110*a,b*, positioned as shown in FIGS. 1-3, result in a temperature reduction of the joint pack 100 between one degree Celsius and seven degrees Celsius, dependant upon the thickness, surface area, and thermal conductivity of the first and the second insulating sheets 110*a,b*.

The insulating sheets 110*a,b* can have a thermal resistance of 55 Kelvin per Watt (K/W) or less. Alternately, the insulating sheets 110*a,b* can have a thermal resistance between 0.16 Kelvin per Watt (K/W) and 55 Kelvin per Watt (K/W). According to some embodiments, the insulating sheets 110*a,b* have a dielectric strength of at least one kilovolt per millimeter (KV/mm). According to some embodiments, the insulating sheets 110*a,b* have a dielectric strength between one kilovolt per millimeter (KV/mm) and two hundred and fifty kilovolts per millimeter (KV/mm).

As best seen in FIGS. 1 and 3, the first side panel 120*a* is positioned adjacent to the first side 100*c* of the joint pack 100 such that that the first side panel 120*a* abuts and encloses the first insulating sheet 110*a* within the busway system 10. Similarly, the second side panel 120*b* is positioned adjacent to the second opposing side 100*d* of the joint pack 100 such that that the second side panel 120*b* abuts and encloses the second insulating sheet 110*b* within the busway system 10. The first and the second side panels 120*a,b* can be attached to the first and the second housings 21*a,b* of the first and the second busway sections 20*a,b* via screws, bolts, or similar fasteners. For example, the first side panel 120*a* can be connected to the first busway section 20*a* via screws that connect with apertures 22*a,b* in the first busway section 20*a*. Attaching the first and the second side panels 120*a,b* to the first and the second housings 21*a,b* electrically grounds the first and the second side panels 120*a,b*.

The busway housing 21*a* is positioned relative to the joint pack 100 such that attaching the first side panel 120*a* to the first and the second busway sections 20*a,b* causes the first side panel 120*a* to force the first insulating sheet 110*a* against the first end $102a_1$ of the first connector plate 102*a* and against the first end $102b_1$ of the second connector plate 102*b* of the second pair of opposing phase connector plates 102. Similarly, the busway housing 21*b* is positioned relative to the joint pack 100 such that attaching the second side panel 120*b* to the first and the second busway sections 20*a,b* causes the second side panel 120*b* to force the second insulating sheet 110*b* against the second end $102a_2$ of the first connector plate 102*a* and against the second end $102b_2$ of the second connector plate 102*b* of the second pair of opposing phase connector plates 102. Put another way, the first and the second side panels 120*a,b* press the insulating sheets 110*a,b* into contact with the first ends $102_{a1,b1}$ and the second ends $102_{a2,b2}$ of the second pair of opposing phase connector plates 102 when coupled with the busway housings 21*a,b*. Positioning the first and the second side panels 120*a,b* directly adjacent to the first and the second insulating sheets 110*a,b* aids in transferring thermal energy from the second pair of opposing connector plates 102 to the first and the second side panels 120*a,b*.

The joint pack 100 can include dielectric gaskets 160*a-d*, as shown in FIG. 3. The dielectric gaskets 160*a-d* provide a dielectric clearance for preventing a dielectric breakdown between the phases and/or between one of the connector plates and ground, such as, for example, the lid 151 or the base 152. The dielectric gaskets 160*a-d* can be made from silicone. As shown, the first dielectric gasket 160*a* is attached to a first end surface of the second insulating plate 130*b*, the second dielectric gasket 160b is attached to a first end surface of the third insulating plate 130c, the third dielectric gasket 160c is attached to a second end surface of the second insulating plate 130b, the fourth dielectric gasket 160d is attached to a second end surface of the third insulating plate 130c. It is contemplated that the joint pack 100 can be made without any dielectric gaskets if additional dielectric clearance is not required. In embodiments that lack the gaskets 160a-d, the top profile of the second and the third insulating plates 130b,c is larger such that the edges of the second and the third insulating plates 130b,c extend into contact with the insulating sheets 110a,b.

Figure 4:
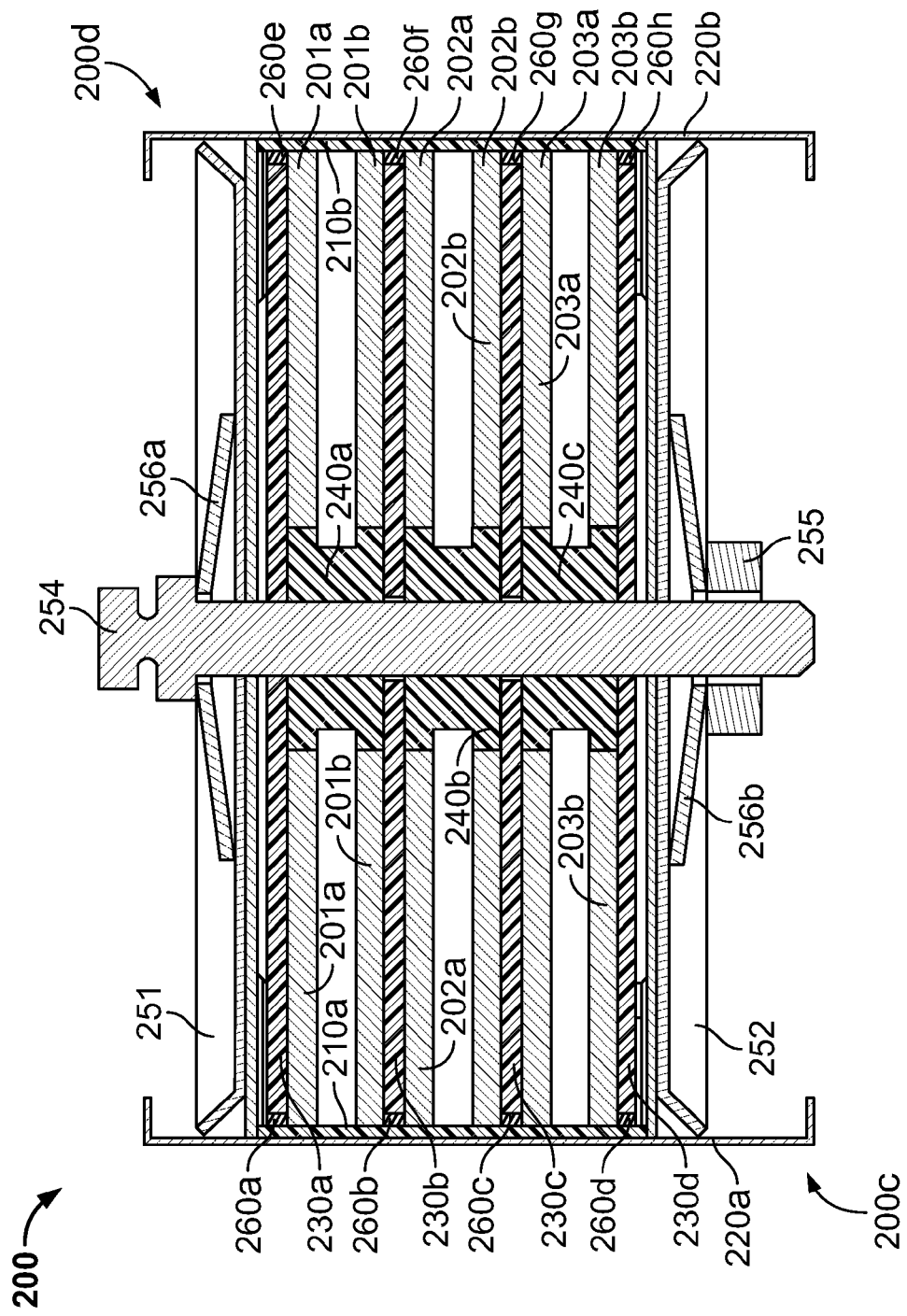
FIG. 4 is a cross-sectional end view of a busway joint pack according to some aspects of the present disclosure.

FIG. 4 illustrates a cross-sectional end view of an exemplary busway joint pack 200. The joint pack 200 is similar to the joint pack 100, described above and shown in FIGS. 1-3, in that the joint pack 200 includes several pairs of opposing phase connector plates 201, 202, and 203, insulating plates 230a-d, phase spacers 240a-c, lid 251, base 252, bolt 254, nut 255, washers 256a,b, dielectric gaskets 260a-h, insulating sheets 210a,b, and side panels 220a,b, which are the same as, or similar to, the pairs of opposing phase connector plates 101, 102, and 103, the insulating plates 130a-d, the phase spacers 140a-c, the lid 151, the base 152, the bolt 154, the nut 155, the washers 156a,b, the dielectric gaskets 160a-d, the insulating sheets 110a,b, and the side panels 120a,b of the joint pack 100, which is described above and shown in FIGS. 1-3.

Each of the pairs of opposing connector plates 201, 202, and 203 corresponds to a particular electrical phase of the joint pack 200. The first pair of opposing connector plates 201 corresponds to phase A, the second pair of opposing connector plates 202 corresponds to phase B, and the third pair of opposing connector plates 203 corresponds to phase C.

Each of the pairs of opposing connector plates 201, 202, and 203 defines a respective space therebetween for receiving a phase-conductor of a busway section, such as one of the phase-conductors 25a-c, 26a-c shown in FIG. 1. The first pair of opposing connector plates 201 includes a first phase connector plate 201a and a second phase connector plate 201b. Similarly, the second pair of opposing connector plates 202 includes a first phase connector plate 202a and a second phase connector plate 202b, and the third pair of opposing connector plates 203 includes a first phase connector plate 203a and a second phase connector plate 203b.

Each of the phase connector plates 210a,b, 202a,b, and 203a,b of the joint pack 200 extends out into contact with the first and the second insulating sheets 210a,b. That is, a first end surface of each of the phase connector plates 201a,b, 202a,b, and 203a,b located at a first side 200c of the joint pack 200 abuts the first insulating sheet 210a, and a second end surface of each of the phase connector plates 201a,b, 202a,b, and 203a,b located at a second side 200d of the joint pack 200 abuts the second insulating sheet 210b. Such abutting connections between the first and the second insulating sheets 210a,b and the phase connector plates 201a,b, 202a,b, and 203a,b can result in transfer of thermal energy from the first, the second, and the third pairs of opposing phase connector plates 201, 202, and 203 to the first and the second side panels 220a,b during use of the joint pack 200 in a busway system (e.g., the busway system 10).

It is contemplated that the abutting connections of the phase connector plates 201a,b 202a,b, and 203a,b of the joint pack 200 with the first and the second insulating sheets 210a,b can result in an increased heat transfer for the first and the third pairs of opposing connector plates 201 and 203 as compared to the joint pack 100, which only includes an abutting connection of the first and the second insulating sheets 110a,b with the second pair of opposing phase connector plates 102. Such a transfer of thermal energy from the interior or core of the joint pack 200 to the first and the second side panels 220a,b can reduce an internal joint pack temperature, thereby increasing the thermal performance of a busway system including the joint pack 200. The first and the second insulating sheets 210a,b, positioned as shown in FIG. 4, results in a temperature reduction of the joint pack 200 of at least one degree Celsius and as much as seven degrees Celsius or more based on calculations.

A reduction of internal joint pack temperature is advantageous at least because it improves the thermal performance of the busway system 10, which directly affects the size of the phase-conductors needed in the busway sections. Thus, an improvement of thermal performance of the busway system 10 allows for the use of phase-conductors having smaller cross-sectional areas and/or an overall smaller busway architecture. Smaller and/or lighter phase-conductors can significantly reduce the cost of fabrication as many phase-conductors are made from relatively expensive metals, such as copper and/or aluminum. As such, even a small reduction in cross-sectional area of a phase-conductor can result in a reduction in cost of a busway system.

A magnitude of internal joint pack temperature reduction is a function of the thermal resistance of the insulating sheets 110a,b. The thermal resistance ($R_{th}$) equals the thickness (t) of the insulating sheet divided by the thermal conductivity (k) of the insulating sheet material times the contact surface area (A), $R_{th}=t/(k*A)$. More thermal energy can be transferred away from the joint pack as the thermal resistance of the insulating sheets 110a,b decreases. Thus, with all other parameters held constant, a decrease in thickness of the insulating sheets 110a,b results in a lower thermal resistance, an increased thermal energy transfer, and a corresponding greater temperature reduction. Likewise, with all other parameters held constant, an increase in thermal conductivity, or an increase in contact surface area, results in a lower thermal resistance, an increased thermal energy transfer, and a corresponding greater temperature reduction. As such, a desired joint pack temperature reduction may be achieved by selecting and positioning thermally conductive and electrically insulating sheets (e.g., the insulating sheets 110a,b) having a thermal conductivity, a contact surface area, and a thickness based on the preceding disclosure.

While particular aspects, embodiments, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A busway joint pack, comprising:
a pair of opposing phase connector plates defining a space therebetween;
a first thermally conductive insulating sheet positioned orthogonal to the pair of opposing phase connector plates and abutting a first side surface of the pair of opposing phase connector plates on one side of the busway joint pack;
a second thermally conductive insulating sheet positioned orthogonal to the pair of opposing phase connector plates and abutting a second side surface of the pair of opposing phase connector plates on an opposing side of the busway joint pack;

a first side panel adjacent to the first thermally conductive insulating sheet on the one side of the busway joint pack; and a second side panel adjacent to the second thermally conductive insulating sheet on the opposing side of the busway joint pack.

2. The busway joint pack of claim 1, wherein each of the first and the second thermally conductive insulating sheets conduct heat from the pair of opposing phase connector plates to the first and the second side panels, respectively, and electrically insulates the pair of phase connector plates from the first and the second side panels, respectively.

3. The busway joint pack of claim 1, wherein the pair of opposing phase connector plates includes a first phase connector plate and a second phase connector plate, the first and the second phase connector plates having a generally rectangular top profile and each plate including a first and a second opposing flanged side surface.

4. The busway joint pack of claim 3, wherein the first flanged side surface of the first and the second phase connector plates abuts the first thermally conductive insulating sheet and the second opposing flanged side surface of the first and the second phase connector plates abuts the second thermally conductive insulating sheet.

5. The busway joint pack of claim 1, wherein the first and the second thermally conductive insulating sheets have a generally rectangular profile such that each sheet electrically insulates the pair of opposing phase connector plates from the first and the second side panels, respectively.

6. The busway joint pack of claim 1, wherein the first and the second side panels have a larger surface area than the first and the second thermally conductive insulating sheets such that the first and the second side panels abut and enclose the first and the second thermally conductive insulating sheets within the busway joint pack, respectively.

7. The busway joint pack of claim 1, wherein the first and the second thermally conductive insulating sheets comprise a material having a thermal resistance of at least 0.16 Kelvin per Watt (K/W) and a dielectric strength of at least one kilovolt per millimeter (KV/mm).

8. The busway joint pack of claim 1, wherein the first and the second thermally conductive insulating sheets comprise a material having a thermal resistance equal to or less than fifty-five Kelvin per Watt (K/W).

9. The busway joint pack of claim 1, wherein the first and the second thermally conductive insulating sheets comprise a material having a dielectric strength between one kilovolt per millimeter (KV/mm) and two hundred fifty kilovolts per millimeter (KV/mm).

10. The busway joint pack of claim 1, wherein the first side panel is configured to force the first thermally conductive insulating sheet against the first side surface of the pair of opposing phase connector plates and the second side panel is configured to force the second thermally conductive insulating sheet against the second side surface of the pair of opposing phase connector plates.

11. The busway joint pack of claim 1, wherein the pair of opposing phase connector plates is a plurality of pairs of opposing phase connector plates, each pair of opposing phase connector plates defining a respective space therebetween for receiving a phase conductor, the busway joint pack further comprising:

a plurality of insulating plates for electrically insulating the plurality of pairs of opposing phase connector plates, one of the plurality of insulating plates being positioned between adjacent ones of the plurality of pairs of opposing phase connector plates such that each pair of opposing phase connector plates is electrically insulated from one or more adjacent pairs of opposing phase connector plates, wherein the first insulating sheet is positioned orthogonal to the plurality of pairs of opposing phase connector plates and abutting a first side surface of at least one of the plurality of pairs of opposing phase connector plates on the one side of the busway joint pack, and the second insulating sheet is positioned orthogonal to the plurality of pairs of opposing phase connector plates and abutting a second side surface of the at least one of the plurality of pairs of opposing phase connector plates on the opposing side of the busway joint pack.

12. The busway joint pack of claim 11, wherein the first side panel is configured to force the first insulating sheet against the first side surface of the at least one of the plurality of pairs of opposing phase connector plates and the second side panel is configured to force the second insulating sheet against the second side surface of the at least one of the plurality of pairs of opposing phase connector plates.

13. The busway joint pack of claim 11, wherein the busway joint pack is a three-phase busway joint pack configured to electrically couple a first three-phase busway section with a second three-phase busway section.

14. The busway joint pack of claim 1, wherein the pair of opposing phase connector plates comprises a first pair of opposing phase connector plates, a second pair of opposing phase connector plates, and a third pair of opposing phase connector plates, the second pair of opposing phase connector plates being positioned between the first and the third pairs of opposing phase connector plates, the first, the second, and the third pairs of opposing phase connector plates being substantially parallel to one another, each pair of opposing phase connector plates defining a respective space therebetween for receiving a phase conductor, the busway joint pack further comprising:

a plurality of insulating plates, one of the plurality of insulating plates being positioned between the first and the second pairs of opposing phase connector plates to at least partially electrically insulate the first and the second pairs of opposing phase connector plates from each other, another one of the plurality of insulating plates being positioned between the second and the third pairs of opposing phase connector plates to at least partially electrically insulate the second and the third pairs of opposing phase connector plates from each other, wherein the first insulating sheet is positioned substantially orthogonal to the pairs of opposing phase connector plates and abutting a first side surface of the second pair of opposing phase connector plates on the one side of the busway joint pack, and the second insulating sheet is positioned substantially orthogonal to the pairs of opposing phase connector plates and abutting a second side surface of the second pair of opposing phase connector plates on the opposing side of the busway joint pack.

15. The busway joint pack of claim 14, wherein the first and the second insulating sheets are positioned and configured to reduce an internal temperature of the busway joint pack at least one degree Celsius.

16. The busway joint pack of claim 14, wherein the first insulating sheet further contacts a first side surface of the first and the third pairs of opposing phase connector plates on the one side of the busway joint pack and the second insulating sheet further contacts a second side surface of the first and the third pairs of opposing phase connector plates on the opposing side of the busway joint pack such that the first and the second insulating sheets transfer heat from the first, the second, and the third pairs of opposing phase connector plates to the first and the second side panels, respectively.

17. The busway joint pack of claim 14, wherein each pair of opposing phase connector plates includes a first phase connector plate and a second phase connector plate, each of the first and the second phase connector plates having a generally rectangular top profile, each of the first and the second phase connector plate of the second pair of opposing phase connector plates including a first and a second opposing flanged side surface.

18. The busway joint pack of claim 17, wherein the first flanged side surface of the first and the second phase connector plates of the second pair of opposing phase connector plates abuts the first insulating sheet and the second opposing flanged side surface of the first and the second phase connector plates of the second pair of opposing phase connector plates abuts the second insulating sheet.

* * * * *